United States Patent [19]

Shead et al.

[11] 4,100,247
[45] Jul. 11, 1978

[54] METHOD OF MANUFACTURING A DISC WHEEL

[75] Inventors: Terence Humphrey Charles Shead, Chorley Wood; Frederick Leslie Hart, Cressage; Herbert John Sharp, Greenford, all of England

[73] Assignee: GKN Sankey Limited, Bilston, England

[21] Appl. No.: 663,645

[22] Filed: Mar. 4, 1976

[30] Foreign Application Priority Data

Mar. 8, 1975 [GB] United Kingdom ............... 9753/75

[51] Int. Cl.² ............................ B29D 3/02; B29F 1/10
[52] U.S. Cl. .................................. 264/271; 264/275; 301/63 PW
[58] Field of Search ............... 301/63; 264/271, 275, 264/268, 255, 273, 274; 51/293

[56] References Cited

U.S. PATENT DOCUMENTS

| 2,607,957 | 8/1952 | Danielson et al. ............ 264/274 |
| 3,773,481 | 11/1973 | Whitaker et al. ............... 51/298 |
| 3,968,996 | 7/1976 | Wilcox .......................... 301/63 PW |

FOREIGN PATENT DOCUMENTS

| 2,248,548 | 4/1973 | Fed. Rep. of Germany ......... 301/63 |
| 2,150,265 | 4/1973 | Fed. Rep. of Germany ... 301/63 PW |
| 2,513,156 | 2/1975 | Fed. Rep. of Germany ......... 301/63 |
| 2,513,187 | 2/1975 | Fed. Rep. of Germany ......... 301/63 |
| 1,372,357 | 10/1974 | United Kingdom ............... 301/63 |

*Primary Examiner*—Donald J. Arnold
*Attorney, Agent, or Firm*—Sughrue, Rothwell, Mion, Zinn and Macpeak

[57] ABSTRACT

A method of manufacturing a disc wheel which is of generally Y-shape in cross sections radial of the rotary axis of the wheel, the stem of the Y providing the central disc of the wheel and having holes for the normal wheel bolts or studs, and the bifurcations of the Y providing the wheel rim. The wheel has an annular metal reinforcement having parts located in the stem and in one of the bifurcations of the Y, the reinforcement including holes corresponding to the holes in the finished wheel for the bolts or studs. A covering of plastics material is moulded over the reinforcement, the covering having an integral extension which provides the other bifurcation of the Y. The plastics covering is moulded onto the reinforcement in a mould cavity defined between first and second mould portions which are movable towards and away from one another in directions parallel to the rotary axis of the wheel between open and closed positions. The reinforcement is located in the mould cavity, at least at the start of the moulding by first and second series of abutments, each abutment of the first series engaging in one of said holes in the reinforcement and each abutment of the second series engaging the reinforcement at a position radially outwardly of the holes with respect to the rotary axis.

8 Claims, 5 Drawing Figures

METHOD OF MANUFACTURING A DISC WHEEL

BACKGROUND OF THE INVENTION

This invention relates to the manufacture of vehicle road wheels of the type having a metal reinforcement with a covering of plastics material, the wheels being designed to receive pneumatic tires.

More specifically the invention is concerned with the manufacture of a disc wheel, hereinafter referred to as being a wheel "of the kind specified," which is of generally Y-shape in cross sections radial of the rotary axis of the wheel, the stem of the Y providing the central disc of the wheel and having holes for the normal wheel bolts or studs, and the bifurcations of the Y providing the wheel rim, the wheel comprising an annular metal reinforcement having parts located in the stem and in one of the bifurcations of the Y, and a covering of plastics material for the reinforcement, the covering having an integral extension which provides the other bifurcation of the Y.

It is an object of the invention to provide a method of making a wheel of the kind specified.

SUMMARY OF THE INVENTION

According to the invention the plastics covering is applied to the reinforcement by moulding in a mould having first and second portions which are movable towards and away from one another in directions parallel to the rotary axis of the wheel between open and closed positions, the reinforcement having holes therein corresponding to the holes in the finished wheel for said bolts or studs and being located at least at the start of said moulding in a mould cavity defined between said mould portions by first and second series of abutments, each abutment of the first series engaging in one of said holes in the reinforcement and each abutment of the second series engaging the reinforcement at a position radially outwardly of said holes with respect to said rotary axis.

The abutments of the first series may be fixed in position during moulding if it is desired to ensure that the plastics covering is interrupted around the bolt or stud holes to give metal-to-metal contact between the reinforcement and the bolt heads or nuts when the finished wheel is in use. If desired, however, the abutments of the first series may be partly withdrawn during moulding so that the reinforcement is completely covered with plastics in the vicinity of the bolt holes which are themselves formed by the abutments of the first series.

The abutments of the second series may either remain in position during moulding or be withdrawn at some fixed stage during moulding to allow the reinforcement to be completely covered where initially engaged by the abutments. If the abutments of the second series are fixed, then in the finished wheel there will be gaps in the plastics covering which may have to be filled by, for example, plastics plugs adhered in place. If it is desired to support the reinforcement by the abutments of the second series in a position on the wheel rim which will be within the tire when the wheel is in use, then it is necessary that the abutments of the second series be withdrawn during moulding so as to leave an unbroken plastics covering in that position otherwise there is a risk of leakage of air from the tire through a gap in the covering.

Preferably, the plastics covering is applied to the reinforcement by compression moulding. The moulding sequence may be to heat the mould portions, put a charge of moulding compound, for example dough-moulding compound, into the second portion of the mould, place the reinforcement in the second portion, place a further charge of dough-moulding compound on top of the reinforcement and then close the mould thus locating the reinforcement on the first and second abutments and moulding the compound around the reinforcement, the heating of the mould being continued to cure the compound.

The reinforcement may initially be located with respect to the second portion of the mould by some of said abutments which are carried by said portion and which are spring-loaded to project from said second portion when the mould portions have been moved away from one another. The spring-loaded abutments will initially locate the reinforcement in a position displaced from its final position in the mold cavity, the abutments being moved against their spring bias to engage stops as the mould portions move towards one another to close the cavity and the reinforcement takes up its final position in the cavity for moulding.

If the abutments or any of the abutments, on the second portion are movable so that they can be withdrawn during moulding they may also be moved to projected positions before moulding initially to locate the reinforcement on the second mould portion, the abutments being withdrawn to positions to support the reinforcement in the mould cavity as or before the mould portions are moved towards one another.

There may, if desired, be more than two series of abutments, the abutments of the further series being fixed or withdrawable as desired.

BRIEF DESCRIPTION OF THE DRAWINGS

The invention will now be described in detail by way of example with reference to the accompanying drawings in which.

DESCRIPTION OF THE PREFERRED EMBODIMENTS

Figure 1:
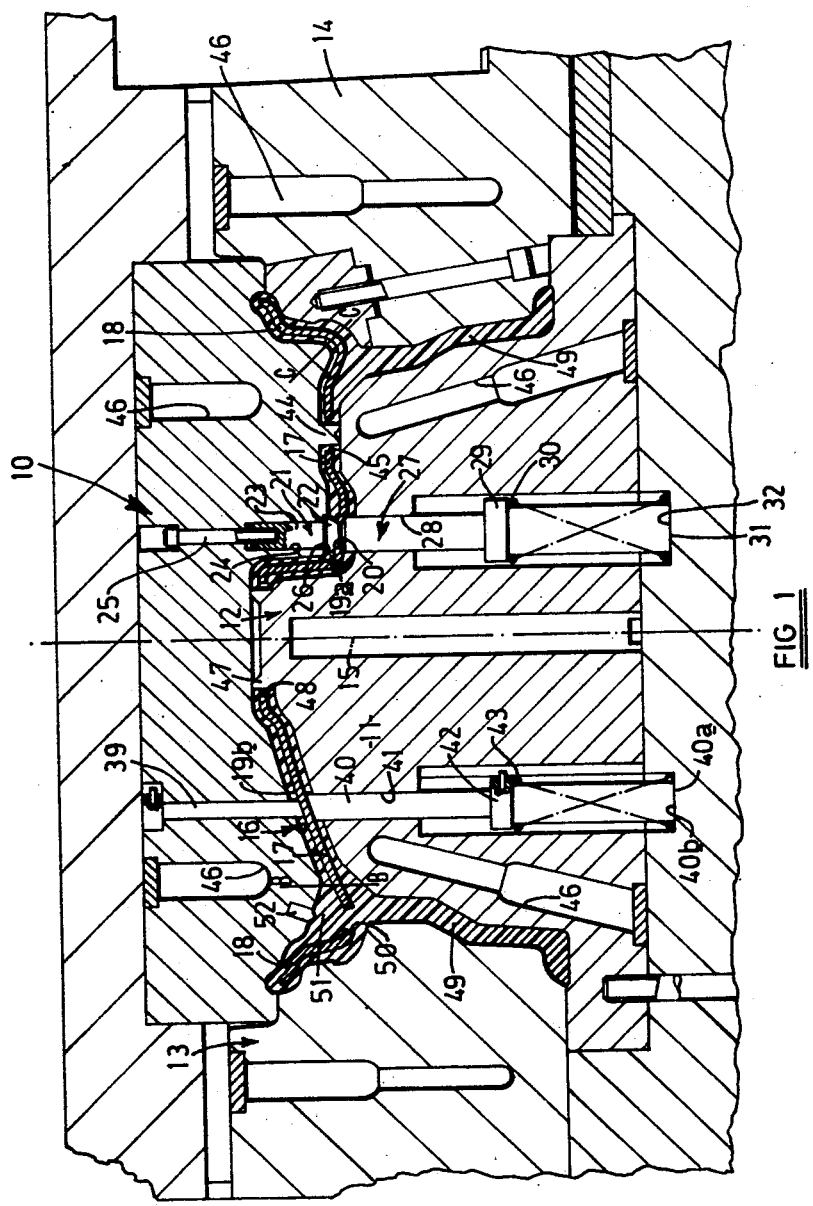
FIG. 1 is a vertical central section through a mould for carrying out the method of the invention.
Figure 2:
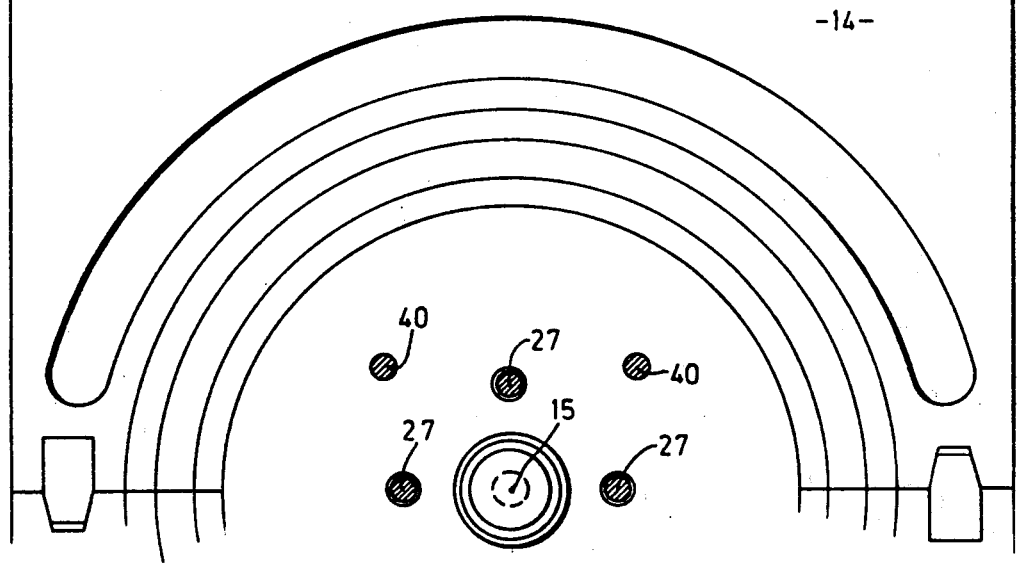
FIG. 2 is a view of the center part of the lower or second mould portion.

Referring now to FIGS. 1 and 2 of the drawings, the mould there shown comprises a first or upper portion 10 and a second or lower portion 11. The second portion 11 comprises a central part 12 and two outer parts 13 and 14. The rotary axis of the wheel to be moulded in the mould is indicated by the chain line 15. The first and second portions 10 and 11 are movable towards and away from one another in directions parallel to the axis 15 whereas the outer parts 13 and 14 are movable relative to the central part 11 in directions radial of the axis 15.

The mould portions between them when in their closed positions, as shown in FIG. 1, define a cavity for moulding a road wheel for a vehicle the wheel being shown in the cavity and comprising a plastic covering on a reinforcement of steel. The reinforcement is indicated generally at 16 and has a part 17 in the wheel disc and another part 18 in the wheel rim. The part 18 is of substantially constant cross-sectional shape throughout its circumference while the part 17 is provided with four recesses equi-angularly spaced about the axis 15 and one of which is shown at 19a on the right hand side of FIG. 1 and four raised ribs 19b between the recesses one of which is shown on the left hand side of FIG. 1.

In each of the recesses 19a is formed a hole 20 which in the finished wheel receives a wheel stud or bolt, the hole having a frusto-conical shape. Mounted in the mould portion 10 are four of a first series of abutments, one of which is indicated at 21. Each abutment has a frusto-conical head 22 which projects into the cavity and is arranged to engage one of the holes 20. The abutment has a cylindrical shank 23 which is received in a bore 24 in the portion 10 and is held therein by means of a bolt 25. The upper part of the head 22 is received in a recess 26 in the lower surface of the mould portion 10.

Aligned with each of the abutments 21 but in the central part 12 of the second mould portion is a spring-loaded abutment forming an abutment of the first series, one of the spring-loaded abutments being indicated generally at 27. The first series of abutments thus comprise the four abutments 21 and the four abutments 27. The abutment 27 is slidable in a bore 28 in the central part 12 and carries a shoulder 29 which is acted upon by a spring 30 so as to urge the plunger upwardly. When the mould is closed with the reinforcement therein as shown in FIG. 1, the lower end 31 of the plunger engages a stop 32 so that the reinforcement 16 is held rigidly between the abutments 21 and 27.

The upper or first mould portion 10 also carries four of a second series of abutments indicated at 39 which are equi-angularly spaced about the axis 15 and are arranged to engage the ribs 19b on the part 17 of the reinforcement. The abutments 39 of the second series are arranged radially outwardly of the axis 15 with respect to the abutments 21 of the first series. Aligned with each of the second abutments 39 is a spring-loaded abutment 40, the abutment 40 being slidable in a bore 41 in the part 12 and being provided with a shoulder 42 on which acts a spring 43 urging the abutment 40 upwardly. When the mould is closed with the reinforcement in position the lower ends 40a of the abutments 40 engage fixed stops 40b so that the reinforcement is held rigidly between the abutments 39 and 40. The second series of abutments are thus constituted by the abutments 39 and 40.

The first portion 10 of the mould is provided with four arcuate ribs, one of which is shown at 44 in the right hand part of FIG. 1, each of which is arranged to pass through an aperture 45 in each of the recessed portions 19a of the part 17 so as to form a ventilation opening in the finished wheel. The free end of each rib 44 is arranged to engage the upper surface of the central part 12 of the lower mould portion.

The mould portions are provided with various bores 46 to receive heaters. The central part 12 of the lower mould portion has a central boss 47 which extends through a central aperture 48 in the reinforcement.

It will be seen that the cavity provided by the mould portions 10 and 11 is of substantially Y-shape in cross sections radial of the axis 15. The reinforcement 16 lies within the stem and one of the bifurcations of the Y; thus the part 17 of the reinforcement lies in the stem of the Y while the part 18 of the reinforcement lies within one of the bifurcations of the Y. The other of the bifurcations of the Y does not contain any part of the reinforcement and the cavity part in which said other bifurcation is formed is indicated at 49. The bifurcations of the Y provide the rim of the wheel on which the tire fits and the stem of the Y provides the wheel disc.

Moulding is carried out as follows. Initially the mould is opened. Thus the portion 10 is withdrawn upwardly away from the portion 11; the outer parts 13 and 14 being closed upon the central part 12. The springs 30 and 43 project the abutments 27 and 40 out from the lower surface of the mould cavity by a substantial extent. A charge of dough moulding composition is then placed over the central portion 12. The charge is so arranged that the spring-loaded abutments 27 and 40 project through the charge as does the central boss 47. The charge may conveniently be formed of a glass fibre reinforced polyester thermosetting moulding compound consisting of a mixture of a polyester resin in a styrene monomer, a low profile additive, zinc stearate, tertiary butyl perbenzoate, calcium carbonate, magnesium hydroxide, and glass reinforcement. The glass reinforcement may be between 15 and 30% by weight, and is in the form of chopped strands 6 to 25mm in length. A suitable glass fibre has been found to be Fiberglas type 832 manufactured by Owens-Corning Ltd.

The reinforcement is now located on the spring-loaded abutments 27 and 40. The reinforcement is made of steel which is free from grease and particles of loose scale. The abutments 27 engage in the recesses around the holes 20 and the abutments 40 engage within the ribs on the reinforcement. A further charge of the moulding composition is now placed over the reinforcement and the mould portion 10 is moved downwardly into engagement with the mould portion 11 as shown in FIG. 1. This causes the heads 22 of the first abutments 21 to engage in the holes 20 and causes the second abutments 39 to engage with the ribs on the reinforcement. The final part of the downward movement of the portion 10 forces the reinforcement downwardly onto the lower part of the charge and the abutments 27 and 40 onto the stops 32 and 40b so that the abutments 21, 39, 27 and 40 completely locate the reinforcement within the mould cavity. The moulding pressure may be of the order of 1000 lb per square inch of the projected area of the moulding. The heaters in the various bores are energised to heat the mould to a temperature of between 150° and 155° C before moulding and are retained energised as required to cure the moulding compound, this may take between 1½ and 3 minutes. After the cure is complete, the upper mould portion 10 is withdrawn as are the outer parts 13 and 14 and the finished wheel can be removed from the central part 12 of the lower mould portion 11.

The finished wheel will have a central aperture which will have been formed by the boss 47 and will also have ventilation openings which will have been formed by the ribs 44. This aperture and these openings will be defined by plastics material which will have filled the gaps between the boss 47 and aperture 48 between the ribs 44 and the apertures 45. There will be an area immediately surrounding each hole 20 which will be free of plastic covering so as to ensure that the heads of the wheel bolts or the wheel nuts engage directly with the reinforcement. There will be gaps in the covering formed by the abutments 39 and 40. For best protection these gaps will have to be plugged with plastics discs (not shown) which may be held in position by suitable adhesives.

The reinforcement is provided with an aperture 50 for a valve and a thickness 51 of plastics material is formed adjacent this aperture. The mould portion 10 carries a spigot 52 having a chamfered end which forms a lead for drilling through the thickness 51 to provide the hole for the valve.

In the method described above, the abutments 21, 27, 39 and 40 remain fixed in position during moulding. It means that after moulding there will be gaps in the plastic covering where the ends of the abutments 39 and 40 contacted the ribs 19b and there will also be exposed metal around the holes 20.

It may be desired to have a complete plastics covering over the reinforcement. Means may be provided for withdrawing the abutments 39 and 40 so that their inner ends are flush with the surface of the mould cavity once moulding has started so that no gaps will be left in the plastics covering. With regard to the abutments 21 and 27, if it is desired to have a plastics covering around the holes in the reinforcement, this can be attained by use of the arrangement in FIGS. 3 and 4.

Referring to these figures, a reinforcement is indicated generally at 60 and corresponds in shape to the reinforcement 16. One of the holes in the reinforcement is indicated at 61, this hole corresponding to one of the holes 20 in FIG. 1. The first abutments comprise a sleeve 62 and a pin 63 having a chamfered portion 64, a cylindrical portion 65 which fits closely within the sleeve 62 and a tapered nose portion 66 which is operative to lead the cylindrical portion 65 into the bore of the sleeve 62. When the mould portions indicated at 67 and 68 are initially closed with the charge between them, the sleeve 62 and the pin 63 are in the position shown in FIG. 3 and it will be seen that the reinforcement 60 is located between the lower end of the sleeve 62 and the chamfered portion 64 on the pin 63.

Figure 3:
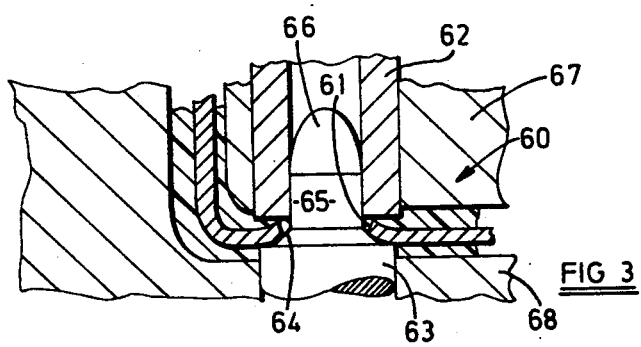
FIGS. 3 and 4 show in detail a form of abutment for forming the bolt holes in the wheel.
Figure 4:
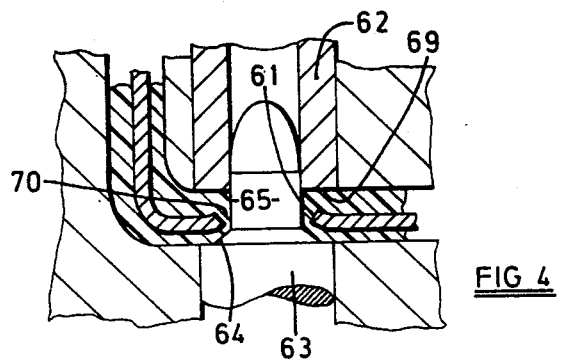

Once the mould has been closed, the pin 63 may be withdrawn from the position shown in FIG. 3 so that the chamfered portion 64 comes clear of the edge of the hole 61 and the sleeve 62 is raised so that its lower end 69 is flush with the upper wall of the mould cavity. The plastics material has thus flowed into the hole 61 as indicated at 70 but a hole is provided through the surface portion by means of the cylindrical part 65 of the pin 63. Thus when the mould is opened a bolt hole will be left within the hole 61, the bolt hole having been formed by the cylindrical portion 65, but the bolt hole will have been formed in the plastics material. The expansion of the plastics material into the voids left by withdrawal of the pin 63 and the sleeve 62, or by the withdrawal of the abutments such as 39 and 40 in FIG. 1, is accomplished by elastic expansion of the material.

Figure 5:
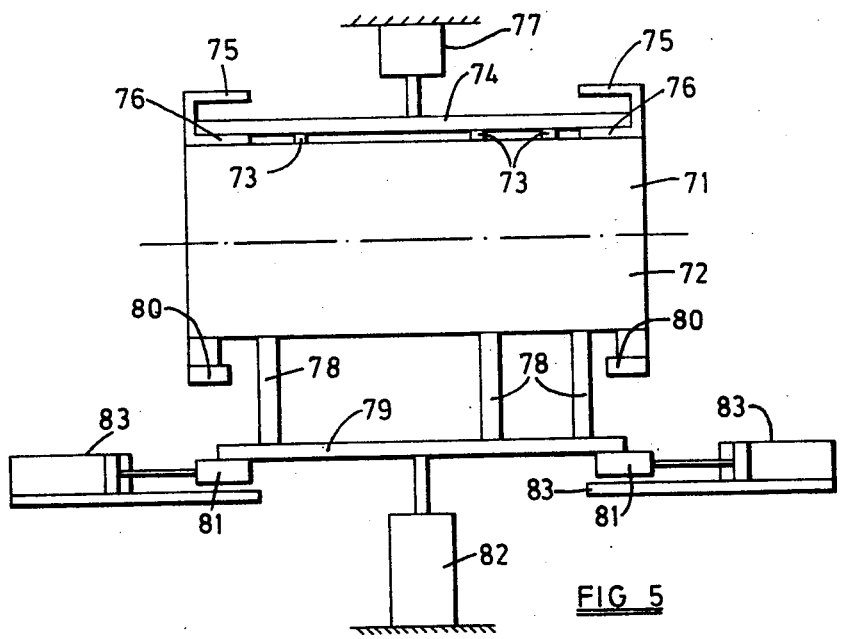
FIG. 5 is a diagram illustrating how the abutments provided in a mould for carrying out the invention may be moved.

FIG. 5 shows means whereby the various abutments may be moved during moulding. Referring to FIG. 5, which is purely diagrammatic, a mould is shown comprising two portions 71 and 72. The upper portion 71 is provided with a number of abutments, some of which are indicated at 73 and which project through the upper surface of the mould portion and are connected to an operating plate 74. This plate is movable between stops 75 and 76 by means of an hydraulic or pneumatic cylinder 77. In a similar manner, the mould portion 72 is provided with a number of abutments, some of which are indicated at 78 and which are connected to a plate 79 which is movable between stops 80 and 81 by means of a hydraulic or pneumatic cylinder 82. The stops 81 are movable by means of hydraulic or pneumatic cylinders 83 between the position shown and retracted positions out of the path of the plate 79.

When the mould is opened and it is desired to locate the reinforcement on the abutments, the hydraulic cylinder 82 is operated to move the plate 79 into engagement with the stops 80 so that the abutments 78 project above the lower mould part and the reinforcement can be mounted thereon easily. The abutments are then withdrawn by the hydraulic cylinder 82 either before, or simultaneously with, the closing of the mould parts until the plate 79 engages the abutments 81. When the mould is initially closed, the plate 74 is in engagement with the stops 76 so that the abutments 73 project into the mould cavity as do the abutments 78.

Once the mould has been closed, the hydraulic cylinder 77 is operated to withdraw the plate 74 into engagement with the stops 75 and this withdraws the abutments to the desired extent. Similarly, the stops 81 are withdrawn by the cylinders 83 and the plate 79 is moved downwardly into engagement with the base plate 83 to withdraw the abutments 78 to the desired extent.

The abutments of the second series could be located at positions different from those indicated in FIG. 1. Thus, for example, the abutments 39 and 40 may be arranged on a circle about the axis 15 and containing the line B—B shown on the left in FIG. 1.

Additionally, or alternatively, there may be further abutments which engage the reinforcement in the area which will be within the tyre when the wheel is in use. For example the abutments may engage the reinforcement on the centre line C—C shown to the right of FIG. 1. If abutments are placed in this position, however, particularly if they engage the part of the rim which will be within the tyre, the abutments must be arranged to be withdrawn during moulding so that there is a complete covering of plastics material within the part of the rim enclosed within the tire. We have found that unless there is a complete covering, there is a danger that air may leak from within the tire between the plastic covering and the reinforcement. It would be possible to overcome this difficulty by so treating the reinforcement that the plastics covering bonded thereto or by filling in the gaps in the covering left by the withdrawal of the abutments, but it is preferred to have supports which may be withdrawn during molding so that a homogeneous covering over the reinforcement may be obtained.

We claim:

1. A method of manufacturing a disc wheel which is of generally Y-shape in cross sections radial of the rotary axis of the wheel, the stem of the Y providing the central disc of the wheel and having holes for the normal wheel bolts or studs, and the bifurcations of the Y providing the wheel rim, the wheel comprising an annular metal reinforcement having parts located in the stem and in one of the bifurcations of the Y, and a covering of synthetic resinous material for the reinforcement, the covering having an integral extension which provides the other bifurcation of the Y, the method comprising applying the synthetic resinous covering to the reinforcement by moulding in a mould having first and second portions which are movable towards and away from one another in directions parallel to the rotary axis of the wheel between open and closed positions, the reinforcement having holes therein corresponding to the holes in the finished wheel for said bolts or studs and being located at least at the start of said moulding in a mould cavity defined between said mould portions by first and second series of abutments, each abutment of the first series engaging in one of said holes in the reinforcement and each abutment of the second series engaging the reinforcement at a position radially outwardly of said holes with respect to said rotary axis.

2. A method according to claim 1 wherein the abutments of the first series remain fixed in position during moulding to provide interruptions in the synthetic resinous material covering around the bolt or stud holes.

3. A method according to claim 1 wherein the abutments of the first series are partly withdrawn during moulding so that the reinforcement is completely covered with synthetic resinous material in the vicinity of the bolt holes which are themselves formed by the abutments of the first series.

4. A method according to claim 1 in which the abutments of the second series remain fixed in position during moulding.

5. A method according to claim 1 wherein the abutments of the second series are withdrawn during moulding so as to allow the synthetic resinous material to flow into the spaces occupied by the abutments at the beginning of the moulding.

6. A method according to claim 1 wherein the synthetic resinous covering is applied to the reinforcement by compression moulding.

7. A method according to claim 6 comprising placing a charge of synthetic resinous dough-moulding compound in the second portion of the mould, placing the reinforcement in the second portion, placing a further charge of synthetic resinous dough-moulding compound on top of the reinforcement and then closing the mould.

8. A method according to claim 7 wherein the reinforcement is initially located with respect to the second portion by some of said abutments which are carried by said portion, the abutments being subsequently withdrawn into a position to support the reinforcement in the closed mould cavity.

* * * * *